United States Patent
Cheng et al.

(10) Patent No.: US 8,648,811 B2
(45) Date of Patent: Feb. 11, 2014

(54) REMOTE CONTROL SYSTEM FOR ELECTRONIC DEVICE AND REMOTE CONTROL METHOD THEREOF

(75) Inventors: Jun Cheng, Guangdong (CN); Wenchuang Zhao, Guangdong (CN); Kun Zhou, Guangdong (CN); Danwei Shi, Guangdong (CN); Shunzhi Lv, Guangdong (CN)

(73) Assignee: Shenzhen Taishan Online Technology Co., Ltd., Shenzhen, Guangdong (CN)

( * ) Notice: Subject to any disclaimer, the term of this patent is extended or adjusted under 35 U.S.C. 154(b) by 240 days.

(21) Appl. No.: 13/123,487

(22) PCT Filed: Sep. 10, 2009

(86) PCT No.: PCT/CN2009/073864
§ 371 (c)(1),
(2), (4) Date: May 10, 2011

(87) PCT Pub. No.: WO2010/040299
PCT Pub. Date: Apr. 15, 2010

(65) Prior Publication Data
US 2011/0216011 A1 Sep. 8, 2011

(30) Foreign Application Priority Data
Oct. 10, 2008 (CN) .......................... 2008 1 0216671

(51) Int. Cl.
*G06F 3/02* (2006.01)

(52) U.S. Cl.
USPC .......................................................... 345/169

(58) Field of Classification Search
USPC .......................................................... 345/169
See application file for complete search history.

(56) References Cited

U.S. PATENT DOCUMENTS

| | | | |
|---|---|---|---|
| 5,719,622 A * | 2/1998 | Conway ..................... | 348/211.8 |
| 6,720,949 B1 * | 4/2004 | Pryor et al. ................. | 345/158 |
| 2005/0156883 A1 * | 7/2005 | Wilson et al. ............... | 345/158 |

* cited by examiner

*Primary Examiner* — William Boddie
*Assistant Examiner* — Sahlu Okebato
(74) *Attorney, Agent, or Firm* — Morris, Manning & Martin, LLP; Tim Tingkang Xia, Esq.

(57) ABSTRACT

A remote control system for electronic device and remote control method thereof, the remote control system comprises a controlled apparatus and a remote controller. The controlled apparatus comprises a processing control system (121) and an instruction execution unit (125) in which at least a video capturing device (122,126) connected to the controlled apparatus is also included. At least a characteristic composition is included on the remote controller, at least a video capturing device (122,126) is used for collecting the characteristic composition on the remote controller the processing control system (121) is used for processing the collected characteristic composition images, parsing into the respective instructions, and giving the instruction execution unit (125) the instructions to execute.

4 Claims, 6 Drawing Sheets

REMOTE CONTROL SYSTEM FOR ELECTRONIC DEVICE AND REMOTE CONTROL METHOD THEREOF

FIELD OF THE INVENTION

The present invention relates to a remote control method and system applied in electronic fields or electronic equipments. More particularly, the present invention relates to a remote control system for electronic device and remote control method thereof.

BACKGROUND OF THE INVENTION

In prior art, in order to facilitate operation, a remote control arrangement is usually employed to control electronic devices. For a long time, when a user needs to operate a device in a remote control way, devices such as joysticks, remote controllers, mouses or touch screens are needed.

The joystick has good handle when operating, but it is too clumsy, so only can be applied to a few game devices.

In comparison, a remote controller provides a non-contact interactive method, which enables the user to operate the device from a certain distance, and is very portable. However, the remote controller has a defect that the user needs to operate keys on the remote controller, and there are always many keys on the remote controller which make the operation very inconvenient. In additional, most electronic devices do not have effective application interface, so the operation of the remote controller is troubled and inconvenient. Take a TV for example, when the volume of the TV should be set, the volume key should be pressed continuously. When the color of the TV should be adjusted, the color adjusting key should be found firstly and then pressed continuously to adjust the color.

The touch screen is a technical device came out recently. It is convenient, but when using it employs a contact control manner. Users should touch the touch screen which is easily dirtied or worn out, and is also expensive.

The current mouse is a tool for completing human-computer interaction. The traditional mouse transmits signals generated by moving or pressing the mouse to a computer through an electrical line. The computer operation system processes these signals. The wired mouse is limited by the length of the wire. A wireless mouse comes out and may replace the wired mouse gradually. However, in prior art, either the wired mouse or the wireless mouse has a limitation that both of which can not operate suspendedly.

Accordingly, the prior art is to be improved and developed.

SUMMARY OF THE INVENTION

The objective of this invention is to provide a remote control system for electronic device and remote control method thereof, so as to overcome said problems in the prior art and to design a device-noncontact control system which has good operating interface.

The technical solution of present invention comprises: a remote control system comprises a controlled apparatus and a remote controller, the controlled apparatus comprises a processing control system and an instruction execution unit, wherein, the remote control system further comprises at least a video capturing device connected to the controlled apparatus; at least a characteristic composition is arranged on the surface of the remote controller; the at least a video capturing device is used for collecting the characteristic composition on the remote controller; the processing control system is used for processing the collected characteristic composition images, parsing into the corresponding instructions, and giving the instruction execution unit the instructions to execute.

The remote control system, wherein, the processing control system further comprises a characteristic composition extraction unit, an instruction parsing unit;

the characteristic composition extraction unit is used for identifying and processing the characteristic composition image collected by the video capturing device, then obtaining a image position of the characteristic composition;

the instruction parsing unit is used for generating an instruction corresponding to the image position of the characteristic composition, and giving the instruction execution unit the instructions to execute.

The remote control system, wherein, the controlled apparatus further comprises a display used for indicating position of the remote controller; the processing control system further comprises a screen mapping unit used for mapping the image position of the characteristic composition to screen position of the display.

The remote control system, wherein, the remote controller further comprises at least a key, and a wireless transmitting apparatus, the controlled apparatus further comprises a wireless receiving apparatus; when the at least a key is pressed, the wireless transmitting apparatus transmits key number to the wireless receiving apparatus, and the instruction parsing unit generates a corresponding instruction according to the key number.

The remote control system, wherein, the instruction parsing unit is further used to generate a corresponding instruction according to moving track of the characteristic composition.

The remote control system, wherein, the moving track of the characteristic composition is an image point sequence of the characteristic composition extracted by the characteristic composition extraction unit.

The remote control system, wherein, the controlled apparatus further comprises at least two video capturing devices, the processing control system further comprises a 3D reconstructing unit used for computing 3D space coordinates of the characteristic composition according to the characteristic composition images extracted by the characteristic composition extraction unit, the moving track of the characteristic composition is 3D space coordinate sequence of the characteristic composition computed by the 3D reconstructing unit.

The remote control system, wherein, the video capturing device is a common camera and the characteristic composition is a centrosymmetric composition which is significantly different from an environmental image.

The remote control system, wherein, the video capturing device is a camera provided with an infrared ray filter, and the characteristic composition is a centrosymmetric body provided with infrared ray reflective coating.

A remote control method of an electronic device, which comprises following steps:

A. using a video capturing device to collect characteristic compositions on a remote controller;

B. identifying and processing the collected characteristic composition images, parsing the image of the collected characteristic composition into corresponding instructions, and giving an instruction execution unit the instructions to execute.

In remote control method, wherein, the step B further comprises the remote controller transmits key instructions through its signal transmitter, then parse the key instructions into corresponding instructions.

In remote control method, wherein, the step B further comprises:

B1. through the process of a processing control system, map motion of the remote controller to position and movement on a screen, and then parse into corresponding instruction.

In remote control method, wherein, the step B further comprises:

B21. process an image of the characteristic composition collected by the video capturing device through a characteristic composition extraction unit, so as to obtain an image position of the characteristic composition;

B22. generate an instruction corresponding to the image position of the characteristic composition by an instruction parsing unit, and giving the instruction execution unit the instruction to execute.

In remote control method, wherein, the step B further comprises:

B23. arrange at least two video capturing devices to the controlled apparatus, compute 3D space coordinates of the characteristic composition by a 3D reconstructing unit according to the characteristic composition images extracted by the characteristic composition extraction unit, B24. process the moving track of the characteristic composition to a 3D space coordinate sequence of the characteristic composition.

The remote control system for electronic device and remote control method thereof, by employing video capturing devices arranged on the controlled apparatus to video capture and compute characteristic composition of the remote controller, map the physical position of the remote controller to the screen, realizes remote control process when the remote controller sweeps in the air. The implementation of present invention is simple and convenient, and the operation of the user is easier.

BRIEF DESCRIPTION OF THE DRAWINGS

The present invention is further illuminated with the drawings combining with the embodiments, wherein.

DETAILED DESCRIPTION OF THE PREFERRED EMBODIMENT

Hereinafter, embodiments of present invention will be described in detail with reference to the accompanying drawings.

Figure 1:
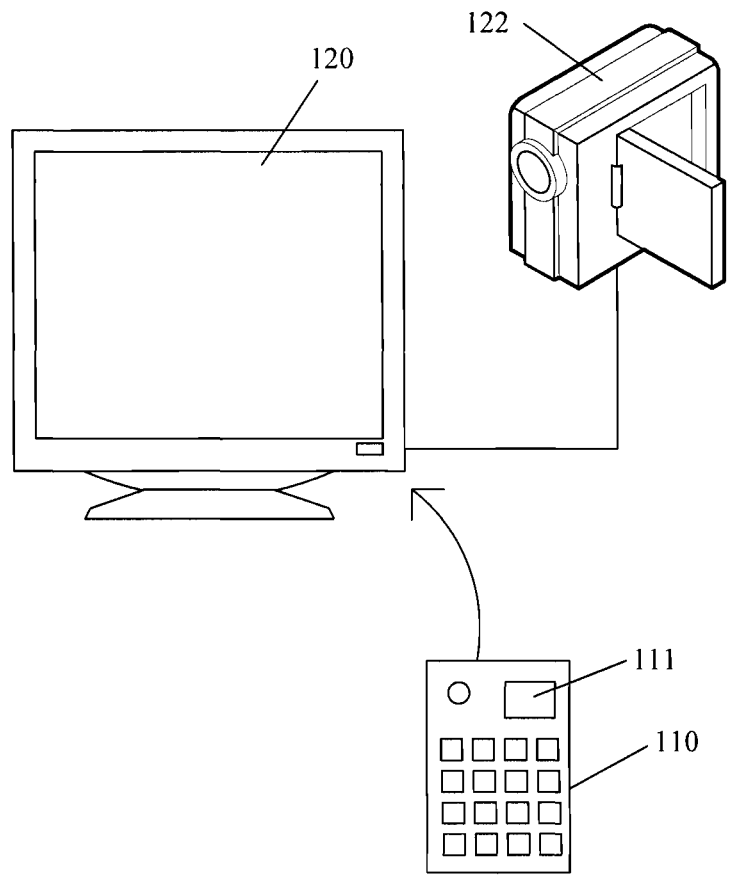
FIG. 1 is a structure diagram of the remote control system of an electronic device according to present invention.

In the remote control system for electronic device and remote control method thereof of present invention, the remote control system comprises a remote controller 110, and a controlled apparatus 120 (as shown in FIG. 1, the controlled apparatus 120 has drive program run on), and a processing control system 121 (as shown in FIG. 2a-2d), and further comprises at least a video capturing device 122 (such as at least a camera) which is connected to the a processing control system 121 in the controlled apparatus 120 for transmitting captured video image to the processing control system 121. The remote controller 110 is provided with characteristic composition 111 which is a centrosymmetric composition which is significantly different from an environmental image, such as a triangle, a pentagram of significant imaging and so on. The controlled apparatus 120 uses the camera to determine the relative position between the remote controller 110 and the controlled apparatus 120. Such process computation is processed by the controlled apparatus 120 according to the video image transmitted by the camera.

The work state of the controlled apparatus 120 can be started by implementing key operation on the remote controller 110, or can be started by a switch circuit arranged in the processing control system 121 in the controlled apparatus 120. When the controlled apparatus 120 is in work state, its video capturing device 122 will be in work state at all times for capturing characteristic composition 111 on the remote controller 110.

Figure 2A:
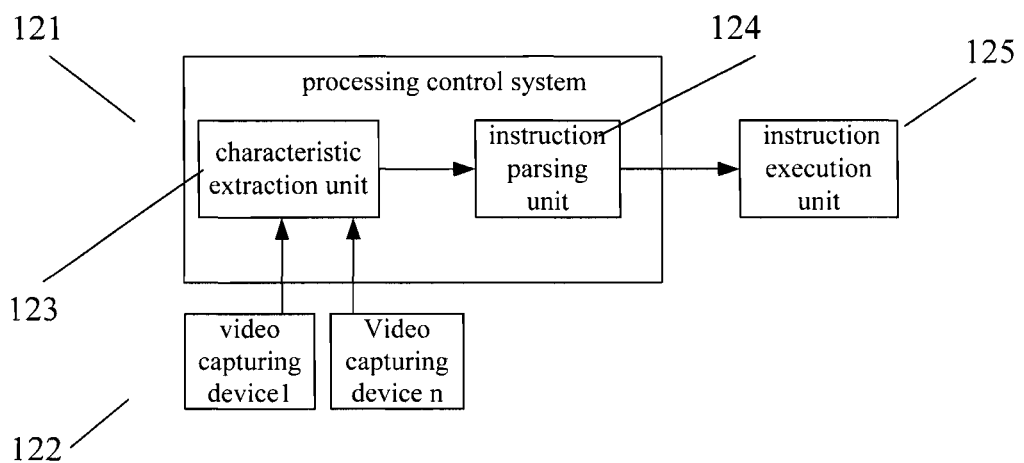
FIG. 2a is a circuit diagram of a first preferred embodiment of the controlled apparatus in the remote control system of present invention.

In the first embodiment of present invention, as shown in FIG. 2a, a processing control system 121 is arranged in the controlled apparatus. A characteristic extraction unit 123 and an instruction parsing unit 124 are provided in the processing control system 121. The characteristic extraction unit 123 is connected to a plurality of video capturing devices, such as video capturing devices 1-video capturing devices n. The video capturing devices 122 are used to implement a video capture to the characteristic composition 111 on the remote controller 110. As the characteristic composition 111 is significantly different from an environmental image, the characteristic extraction unit 123 can extract image of the characteristic composition 110, determine and process the position of the characteristic composition 110. In such a way, the characteristic extraction unit 123 can determine the moving track and final position of the remote controller 110. For example, the characteristic extraction unit 123 defines and interprets a motion of the remote controller 111 that rotating a circle clockwise as "pressing the left key". While the characteristic extraction unit 123 defines and interprets a motion of the remote controller 111 that rotating a circle anticlockwise as "pressing the right key", and so on.

The characteristic composition moving track extracted by the characteristic extraction unit 123 can be interpreted by the instruction parsing unit 124 to be corresponding an instruction which can be transmitted to the instruction execution unit 125 to execute immediately. The instruction execution unit 125 in the processing control system 121 of present invention is the same as the instruction execution unit in traditional remote controller or TV, and not described here for concise.

The instruction parsing unit comprises an identifying unit which forms the characteristic composition images extracted by the characteristic extraction unit into a sequence according to the time order, that is, the moving track of the characteristic composition, then identifies the moving track to corresponding motion mode. The identifying method is that for each motion mode, collect corresponding sample, and extract characteristic vector of each sample, so as to obtain the characteristic vector set of the motion mode. Mapping between characteristic vector of the motion mode and the motion mode is completed by vector set training classifier of each motion mode. For a motion mode to be identified, the characteristic vector is extracted, and the motion mode is classified by a classifier. It should be pointed out that, the training to the classifier can be performed off-line. It is enough to save the training result, that is, the mapping relationship between the characteristic vector of the motion mode and the motion mode. When the classifier classifies the motion mode to be identified, it is enough to read the mapping relationship.

Supposing that $\{P^1, \ldots, P^k, \ldots, P^K\}$ is a sample of a motion mode, that is, the characteristic vector of the motion mode is $\{v^1, a^1, \ldots, v^j, a^j, \ldots v^{K-2}, \ldots, a^{K-2}\}$ wherein, $P^k$ is position of the characteristic composition, $v^j$ is the rate of the characteristic composition, $a^j$ is the acceleration of the characteristic composition, wherein, K is an integer greater than 2, k is a positive integer not greater than K, j is a positive integer not greater than K–2. When $P^k$ is a 2D point (a image point) having a coordinate of $(x^k, y^k)$, the characteristic vector is set to be $(v_x^1, v_y^1, a_x^1, a_y^1, \ldots, v_x^j, v_y^j, a_x^j, a_y^j, \ldots, v_x^{K-2}, v_y^{K-2}, a_x^{K-2}, a_y^{K-2})$, wherein, $(v_x^j, v_y^j) = (x^{j+1} - x^j, y^{j+1} - y^j), (a_x^j, a_y^j) = (v_x^{j+1} - v_x^j, v_y^{j+1} - v_y^j)$; When $P^k$ is a 3D point (a physical point) having a coordinate of $(x^k, y^k, z^k)$, the characteristic vector is set to be $(v_x^1, v_y^1, v_z^1, a_x^1, a_y^1, a_z^1, \ldots, v_x^j, v_y^j, v_z^j, a_x^j, a_y^j, a_z^j, \ldots, v_x^{K-2}, v_y^{K-2}, v_z^{K-2}, a_x^{K-2}, a_y^{K-2}, a_z^{K-2})$ wherein $(v_x^j, v_y^j, v_z^j) = (x^{j+1} - x^j, y^{j+1} - y^j, z^{j+1} - z^j)$, $(a_x^j, a_y^j, a_z^j) = (v_x^{j+1} - v_x^j, v_y^{j+1} - v_y^j, v_z^{j+1} - v_z^j)$.

Before training, moving track data of various motion modes are collected (such as rotating the remote controller clockwise, rotating the remote controller anticlockwise and so on). These data are 2D (image) or 3D (space) points of a series (such as, K=8) of space points used for providing necessary study sample for consecutive training classifier, for example, collecting 500 groups motion of rotating the remote controller clockwise, 500 group motion of rotating the remote controller anticlockwise, wherein, C=2 classes, and N=1000 samples, C is the quantity of the motion mode.

The flow of the training classifier is briefed as follows: (1) process each group of track data to obtain a motion mode data characteristic vector, then combine the motion mode data characteristic vectors to form a characteristic vector set; (2) find a plurality of classifying curves or curved surfaces according to the characteristic vectors of the samples, and then separate C+1 classified areas by the classifying curves or curved surfaces, so that characteristic vectors of motion mode data of each sample are distributed in respective different classified area which is divided according to the numerical value of the characteristic vectors, that is, create a mapping relationship between the characteristic vector space to the class.

In order to express the classifying process visually, supposing the characteristic is 2D, as shown in FIG. 2, black square is the I class characteristic vectors obtained when training (such as motion of rotating the remote controller clockwise), black triangle is II class characteristic vectors obtained when training (such as motion of rotating the remote controller anticlockwise), black circle is III class characteristic vectors rather than the above mentioned two classes (for example, such class of vectors can be obtained by collecting irregular motion process). Curve 1 is the classifying line of the I class characteristic and the II class characteristic, inside of the curve 1 is vector set corresponding to the I class characteristic. Curve 2 is the classifying line of the II class characteristic and the III class characteristic, inside of the curve 1 is vector set corresponding to the II class characteristic, and outsides of the curve 1 and curve 2 are vector set corresponding to the III class characteristic.

When the dimension of the characteristic is large, the dimension of the curve rises up to curved surface, the method of computing curve/curved surface belongs to content of mode identifying technology, and can refer to "mode classifying (written by dica, translated by Lihongdong and so on, China Machine PRESS)".

Figure 2B:
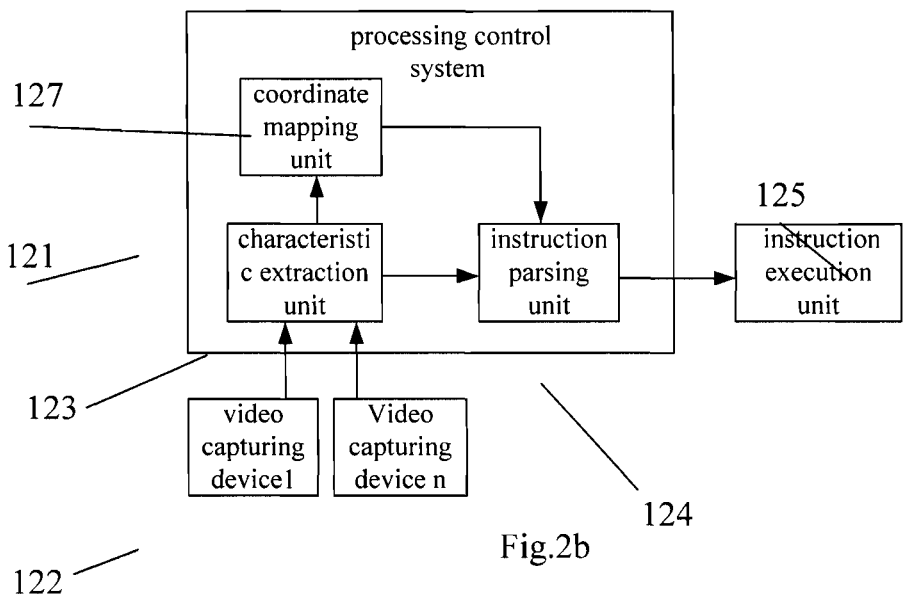
FIG. 2b is a circuit diagram of a second preferred embodiment of the controlled apparatus in the remote control system of present invention.

As shown in FIG. 2b, is a circuit diagram of a second preferred embodiment of the controlled apparatus in the remote control system of present invention, when comparing with the first embodiment, the processing control system 121 further comprises a coordinate mapping unit 127, which is used to show the position of the remote controller 110 (such as showing a mouse image) on the display after computing according to moving position of the remote controller characteristic component 111 obtained by the characteristic extraction unit 123 while the instruction parsing unit 124 is transmitting corresponding instruction.

The coordinate mapping unit 127 is mainly used to map the position of the remote controller 110 from the image coordinate to the screen coordinate of the display. The processing process comprises:

supposing the screen width is Width_scr, the height is Height_scr, then point (u,v) on the screen satisfies following conditions: Width_scr, Height_scr are natural numbers, u is a nonnegative integer smaller than Width_scr, and v is a nonnegative integer smaller than Height_scr.

Supposing the width of the imaging plane is Width_cam, the height is Height_cam, supposing the operation area of the remote controller is an area imaging in a certain rectangle, supposing the left top angular point is (x_ul, y_ul), and the right top angular point is (x_lr, y_lr), wherein, x_ul, y_ul, x_lr, y_lr are all integers, and $0 \leq x\_ul < x\_lr < \text{Width\_scr}$, $0 \leq y\_ul < y\_lr < \text{Height\_scr}$.

Supposing the position of the remote controller in the imaging plane of the camera is (x_cam, y_cam), the position is (x_scr, y_scr) after mapping to the screen coordinate system, then the mapping relationship can be expressed as follows:

$$x_{scr} = \begin{cases} 0 & x\_cam < x\_ul \\ (x\_cam - x\_ul)\dfrac{\text{Width\_scr} - 1}{x\_lr - x\_ul} & x\_ul \leq x\_cam \leq x\_rl \\ \text{Width\_scr} - 1 & x\_cam > x\_rl \end{cases} \quad (1)$$

$$y_{scr} = \begin{cases} 0 & y\_cam < y\_ul \\ (y\_cam - y\_ul)\dfrac{\text{Height\_scr} - 1}{y\_lr - y\_ul} & y\_ul \leq y\_cam \leq y\_rl \\ \text{Width\_scr} - 1 & y\_cam > y\_rl \end{cases}$$

Figure 2C:
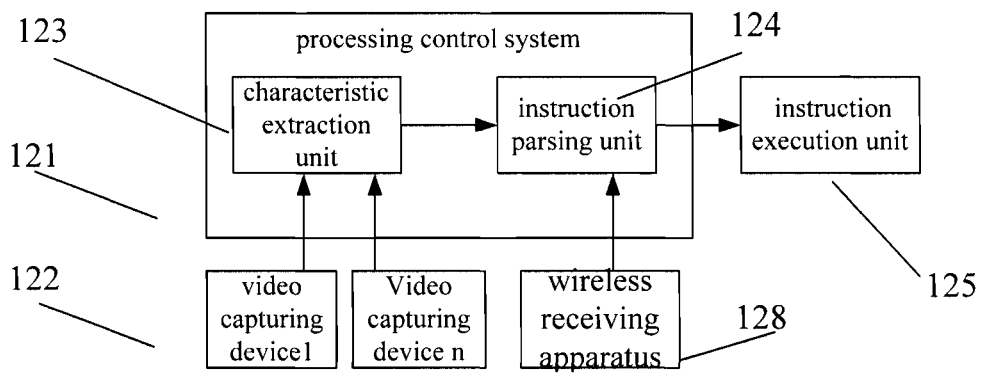
FIG. 2c is a circuit diagram of a third preferred embodiment of the controlled apparatus in the remote control system of present invention.
Figure 3:
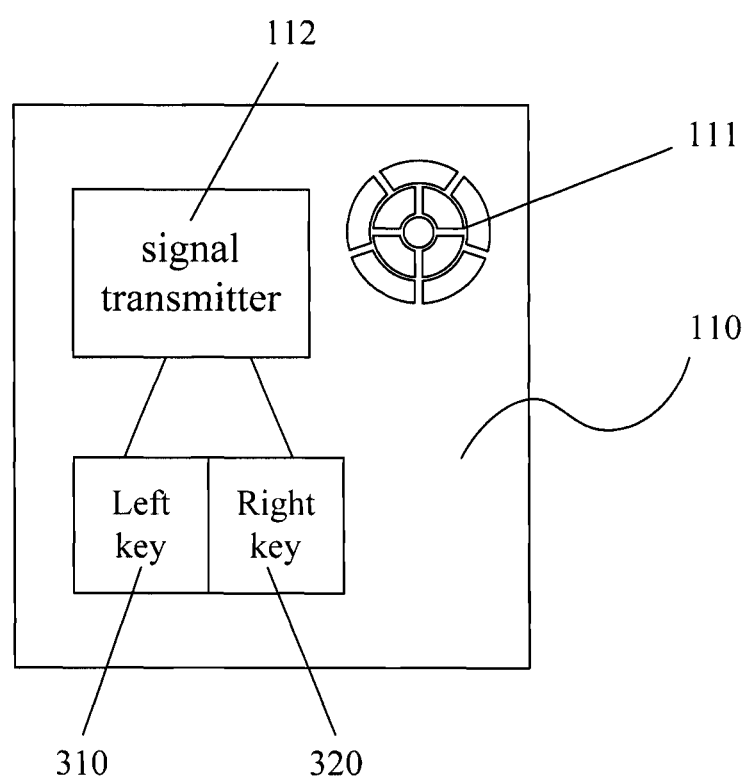
FIG. 3 is a circuit diagram of the remote controller in the third preferred embodiment in the remote control system of present invention.

As shown in FIG. 2c, is a circuit diagram of a third preferred embodiment of the controlled apparatus in the remote control system of present invention, when comparing with the first embodiment, the controlled apparatus 120 is provided with a wireless receiving apparatus 128. Via receiving instruction transmitting by signal transmitter 112 on the remote controller 110 (as shown in FIG. 3) to the controlled apparatus 120, the wireless receiving apparatus 128 receives the control signal, and processes the control signal to corresponding control instruction (such as left key determining operation) transmitting to the instruction parsing unit 124, and then transmits to the instruction execution unit 125 to execute. The wireless transmitting technology and protocol are common in prior art, such as wireless signal, and not described here for concise.

The wireless receiving apparatus 128 provided on the controlled apparatus 120, may receive instruction transmitting by signal transmitter 112 on the remote controller 120, and the instruction is computed and processed via the processing control system 121, then corresponding menu and instruction prompt are displayed on the display device. Based on the moving of the characteristic composition 111 on the remote controller, the camera implements a capturing and computing process, so as to display position of a mouse or similar image on the display device. Then the corresponding selected menu item is implemented according to the instruction received by the wireless receiving apparatus 128.

Figure 2D:
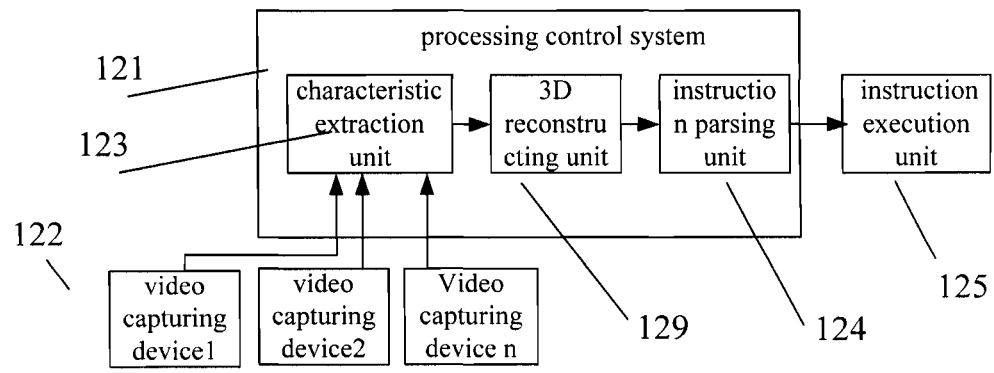
FIG. 2d is a circuit diagram of a fourth preferred embodiment of the controlled apparatus in the remote control system of present invention.

As shown in FIG. 2d, is a circuit diagram of a fourth preferred embodiment of the controlled apparatus in the remote control system of present invention. In the processing control system 121, a 3D reconstructing unit 129 is arranged between the characteristic extraction unit 123 and the instruction parsing unit 124. The 3D reconstructing unit 129 is used for 3D reconstructing the obtained moving track of the remote controller characteristic composition 111, so as to identify more control instruction and track position.

In the remote system of present invention, the operation of processing instruction by the processor of the controlled apparatus comprises but not limit to:

1. showing menu, progress bar on the display device;
2. adjusting menu item, progress bar and so on with the change of the remote controller position;
3. performing corresponding operation according to instruction transmitted by the wireless receiving device, such as adjusting volume, brightness, and scene and so on.

Figure 5:
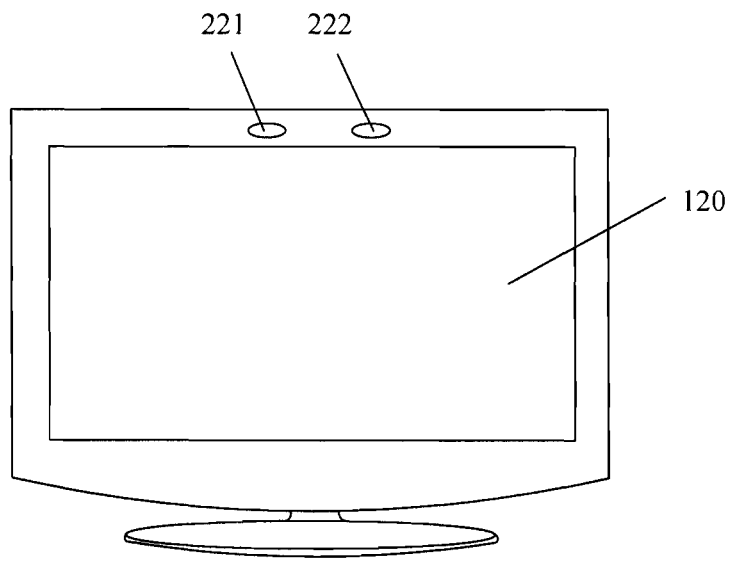
FIG. 5 is a front schematic diagram of the controlled apparatus of TV in the remote control system of present invention.

In the remote system of present invention, take TV for example, besides common TV structure, the structure of the controlled TV further comprises two cameras 221, 222 arranged on the body of the TV. As shown in FIG. 5, the relative position relationship of the two cameras, the parameters inside each camera are obtained by calibrating the camera parameter before the TV leaves the factory, and stored in the TV, and used to determine the position of the mouse relative to the TV when processing the image obtained by the two cameras.

Figure 4:
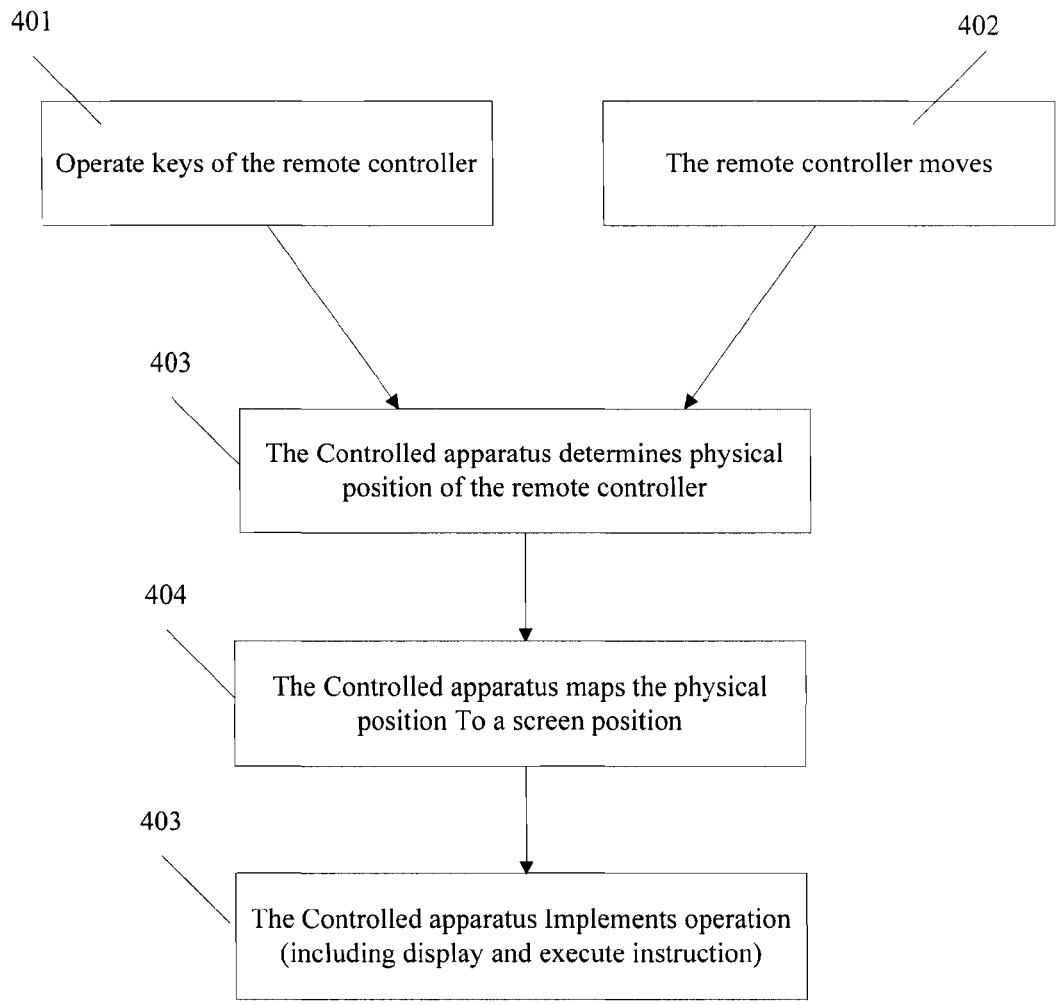
FIG. 4 is an approximate flow chart of the remote control method of present invention.

As shown in FIG. 4, is the implementation process of the remote control method of the electrical device of present invention. In step 401, at first trigger the controlled apparatus to implement process of determining physical position of the remote controller (as shown in step 403) via key operation of the remote controller. The controlled apparatus captures the movement of the remote controller via video capturing device connected to and controlled by itself (block 402), mainly performs a computing process through the characteristic composition movement. In step 404, the controlled apparatus maps movement physical position of remote control to position on the screen. The menu item should be opened and the operation should be controlled according to the key of the remote controller. In step 405, implement menu function of corresponding position, corresponding display can be performed on the display of the controlled apparatus, and instruction can be correspondingly implemented.

Figure 6:
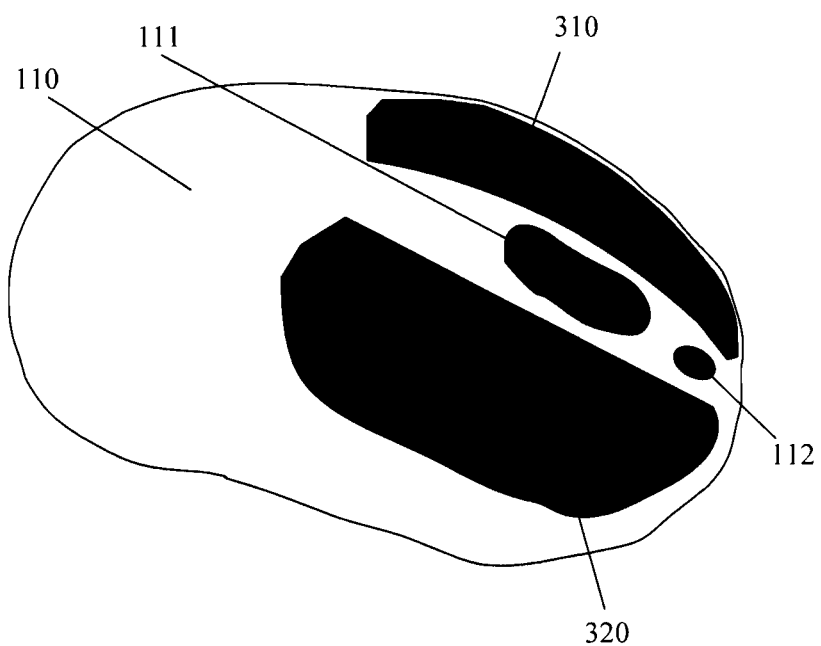
FIG. 6 is an embodiment diagram of the remote controller in the remote control system of present invention.

The structure of the remote controller 110 in present invention is similar to a wireless mouse. As shown in FIG. 6, the usage of the remote controller 110 is also similar to the usage of a wireless mouse. Of course, the form of the remote controller 110 may have more various forms, such as arranged to be wireless key module or wireless keyboard of a game device. The remote controller generally comprises left key 310, right key 320 and signal transmitter 112. Besides, a characteristic composition 111 used to mark the remote controller is also comprised, such as the black step arranged in the front. The arrangement of the characteristic composition may be in different forms, just facilitating the identification of the video capturing device is enough. The camera on the controlled apparatus TV determines the position of the remote controller relative to the TV through obtaining the position of the characteristic composition.

Function of each key on the remote controller is as follows: the right key of the remote controller is used to control a pop-up menu, the left key of the remote controller is used to determine entering of the menu item; the signal transmitter is used to transmit message that the right and left keys of the remote controller are pressed to the TV. The technology employed by the signal transmission is common technology, and not described here for concise. The characteristic composition is used to determine the current menu item.

The usages of the remote controller of present invention can be divided into three types.

The first type is operating items on the screen, for example, there are two icons of "video" and "game"; when "game" icon is clicked, the TV enters game state; when "video" icon is clicked, the TV enters video state. In order to determine which icon is clicked, the physical position of the remote controller should be obtained, and mapped to the screen. In order to facilitate observation, the position of the remote controller should be marked on the screen.

The second type is operating vertical items. For example, when click the right key of the remote controller, the screen will display pop-up vertical menu, then corresponding menu can be selected for operation.

The second type is operating horizontal items. For example, when volume should be set, click and enter the volume adjusting menu item, so that the screen will display progress bar. At that time, left and right move the remote controller to a corresponding position, and press the left key of the mouse to confirm such position, then the volume can be adjusted.

It should be explained that, for device having menu and progress bar operations such as a computer, just the first step operation should be completed, that is, just the step of mapping the physical mapping of the remote controller to the screen point should be completed, and the consecutive menu and progress bar operations will be automatically completed by the computer operation system. The problem of suspended operation of the mouse can be solved by the first step operation.

The second and third operations are mainly used to solve problem that device such as a TV does not have menu and progress bar operations, and meanwhile to provide a operation interface which can be realized by encoding in the prior TV soft.

The mapping and computing process from the physical position of the remote controller in present invention to the screen point are illuminated as follows:

When the remote controller in present invention operates the controlled apparatus such as a TV at a particular position ($x_w$, $y_w$, $z_w$), a limited area near the particular position will be mapped as an area of the whole screen. When the key of the remote controller such as the left key is pressed to trigger the controlled apparatus to obtain position of the remote controller, at the start position, the position of the remote controller can be set in the middle of the screen, or the position of the remote controller can be set at a default item of the screen menu.

In the processing control system of the controlled apparatus, the screen width is Width_scr, the height is Height_scr, then point (u,v) on the screen satisfies following conditions: u is a nonnegative integer smaller than Width_scr, and v is a nonnegative integer smaller than Height_scr.

When considering use habit of user, when the position of the remote controller of present invention moves rightward and leftward, the mapping of position of the remote controller on the screen should move rightward and leftward. When the position of the remote controller of present invention moves upwards and downwards, the mapping of position of the remote controller on the screen should moves upwards and downwards. Of course, if the user has a specific habit, an opposite mapping relationship also can be set.

For convenience, a body coordinate system of a certain camera can be used as a world coordinate system. When assembling the camera, the optical axis $OZ_w$ of the camera is perpendicular to the surface of the screen onwards, $OX_w$ axis is horizontal and rightward, $OY_w$ axis is perpendicular and downward.

Supposing that when the operation of present remote control method starts, the position of the remote controller is ($x_0$, $y_0$, $z_0$), the distance of each pixel on the screen corresponding to the horizontal coordinate axis $OX_w$ direction is $d_x$, the distance of each pixel on the screen corresponding the perpendicular coordinate axis $OY_w$ direction is $d_y$. In order to make sure convenience of the operation, the set of $d_x$, $d_y$ should consider moveable distance of the human hand and arm and the precision determination of the location of the characteristic composition.

Map physical point ($x_0$, $y_0$, $z_0$) to screen point (0, 0), map physical point ($x_0$+Width_scr*$d_x$,$y_0$,$z_0$) to screen point (Width_scr, 0), map physical point ($x_0$+(Width_scr−1)*$d_x$, $y_0$+(Height_scr−1)*$d_y$,$z_0$) to screen point (Width_scr−1, Height_scr−1), map physical point ($x_0$,$y_0$+(Height_scr−1)*$d_y$,$z_0$) to screen point (0, Height_scr−1). u coordinates of screen points corresponding to points of $x_w$≤$x_0$ are mapped to 0, u coordinates of screen points corresponding to points of $x_w$≥$x_0$+(Width_scr−1)*$d_x$ are mapped to Width_scr−1, v coordinates of screen points corresponding to points of $y_w$≤$y_0$ are mapped to 0, and v coordinates of screen points corresponding to points of $y_w$≥$y_0$+(Height_scr−1)*$d_Y$ are mapped to Height_scr−1.

$$u = \begin{cases} 0 & x_w \leq x_0 \\ [(x_w - x_0)/d_x] & x_0 < x_w < x_0 + (\text{Width\_scr} - 1) * d_x \\ \text{Width\_scr} - 1 & x_w \geq x_0 + (\text{Width\_scr} - 1) * d_x \end{cases} \quad (2)$$

$$v = \begin{cases} 0 & y_w \leq y_0 \\ [(y_w - y_0)/d_y] & y_0 < y_w < y_0 + (\text{Height\_scr} - 1) * d_y \\ \text{Height\_scr} - 1 & y_w \geq y_0 + (\text{Height\_scr} - 1) * d_y \end{cases}$$

[($x_w$−$x_0$)/$d_x$] expresses performing a rounding operation to ($x_w$−$x_0$)/$d_x$,[($y_w$−$y_0$)/$d_y$] expresses performing a rounding operation to ($y_w$−$y_0$)/$d_y$. The method of rounding operation is rounding off scheme.

1. The processing process of mapping relationship between movement of the vertical position of the remote controller and the controlled apparatus.

Figure 7:
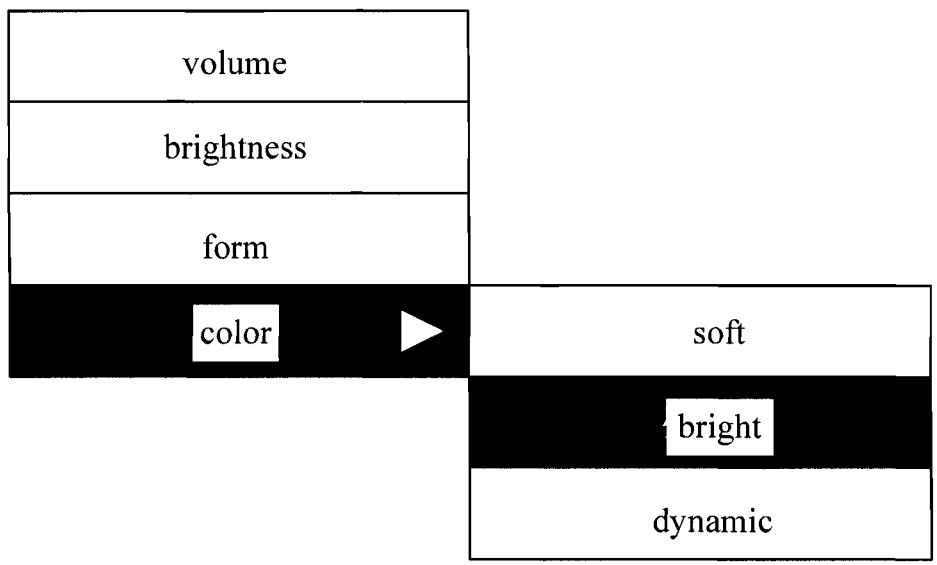
FIG. 7 is an embodiment diagram of vertically remote selecting menu item of the TV by a remote controller in the remote method of present invention.

When the right key of the remote controller of present invention is pressed, the signal transmitter transmits the message that the right key is pressed to a TV, and the processing control system of the TV records the position of the remote controller ($x_0$, $y_0$, $z_0$) at this time, controls pop-up menu and displays it on the TV screen. For example, in present embodiment, the menu comprises four menu items: volume, brightness, form and color, as shown in FIG. 7.

By moving the remote controller upwards and downwards, the processing control system of the TV in present invention will reconstruct position of the characteristic composition (reconstructed space position), and map the position of the remote controller to one of all the menu items, which is called as current menu item, and then highlight the current menu item.

If the current menu item is "color" item, as the current menu item still has a sub-menu, at this time, the processing control system of the TV will pop-up corresponding sub-menu, and show such sub-menu on the display screen. Now, if the remote controller of present invention moves rightwards, the processing control system of the TV will compute the position of the remote controller, when it is found that the remote controller moves rightwards, the entering of next menu item of present menu item will be shown in the screen, and the determination that which menu item will be highlighted will be made according to the position of the remote controller. When moving the remote controller of present invention upwards or downwards, the highlighted menu item will be changed (current menu item).

When the user desired item is the current menu item, the left key of the mouse is clicked for selecting determination. Signal transmitter transmits the selected signal to the processing control system of the TV which adjusts the color of the TV screen to color corresponding to "bright", that is, implementing the item corresponding to the menu.

It should be explained that, the set of the menu item in present method can be set by the movement of the vertical position of the remote controller, or can be set by the movement of the horizontal position of the remote controller, which is predetermined according to use habit of different people.

The processing process of the vertical mapping relationship in method of present invention is illuminated in detail as follows.

Construct an absolute coordinate system for present invention, determine 3D coordinate of the remote controller in the coordinate system, and map the 3D coordinate of the remote controller to the coordinate of the TV screen. In order to determine the 3D coordinate position, at least two cameras are arranged.

For convenience, a body coordinate system of a certain camera in the two cameras can be used as a world coordinate system. Considering the fact that the TV is always placed horizontally, when assembling the camera, the optical axis $OZ_w$ of the camera is perpendicular to the surface of the screen onwards, $OX_w$ axis is horizontal and rightward, $OY_w$ axis is perpendicular and downward.

Supposing the position of the remote controller is ($x_w$, $y_w$, $z_w$) at a certain time, then map $y_w$ to corresponding menu position. Supposing the position of the remote controller is ($x_0$, $y_0$, $z_0$) when the right key is pressed, the distance of each menu item corresponding to the $OY_w$ direction is d. In order to make sure convenience of the operation, the set of d should consider moveable distance of the human hand and arm and the precision determination of the location of the characteristic composition.

Supposing the menu of current level has N menu items in total, the number of the menu item corresponding to the current position is n, wherein, n is a natural number not greater than N. In such a way, the mapping relationship between the current position of the remote controller and the menu item number n is:

$$n = \begin{cases} 1 & y_w \leq y_0 + d \\ [(y_w - y_0)/d] & y_0 + d < y_w < y_0(N-1)d \\ N & y_w \geq y_0 + (N-1)d \end{cases} \quad (3)$$

Wherein, $[(y_w-y_0)/d]$ is an integer after rounding and not greater than $(y_w-y_0)/d$.

When there are multilevel menus, for example, as the aforementioned example, when enters the sub-menu under the "color" menu, the mapping relationship also uses the relationship in formula (2) with the difference that $y_0$ should be corrected, for example, $y_0$ can be corrected to be $y_0+(n-1)d$, meanwhile, d also can be corrected to be distance d' of $OY_w$ direction corresponding to the sub-menu, and N also should be corrected to be the amount of all menu items in the sub-menu.

Then, the mapping relationship between the current position of the remote controller and the menu item number n is:

$$m = \begin{cases} 1 & y_w \leq y_0 + (n-1)d + d' \\ [(y_w - (y_0 + (n-1)d))/d'] & y_0 + (n-1)d + d < y_w < y_0 + (n-1)d + (M-1)d' \\ M & y_w \geq y_0 + (n-1)d + (M-1)d' \end{cases} \quad (4)$$

When there are sub-menu is lower level, the determination of the mapping relationship between the current position of the remote controller and the menu item number n can be completed by repeating aforementioned process.

It should be illuminated that, the aforementioned mapping manner is a simple mapping manner, the physical height of each menu item in menu of each level is the same. In fact, there may be other mapping manner, for example, the physical height corresponding to each menu item can be placed in a table, and the mapping between the position of the remote controller and the menu item number can be completed by reading information of the table.

2. The processing process of mapping relationship between movement of the position of the remote controller and the controlled apparatus.

The operation process of vertical menu item has been illuminated, and the operation process of horizontal menu item will be illuminated as follows.

Figure 8:
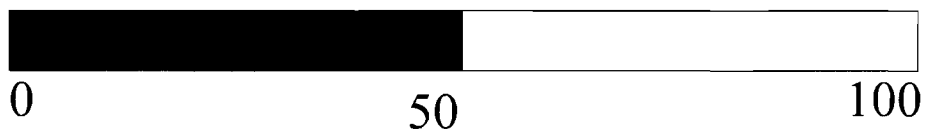
FIG. 8 is an embodiment diagram of horizontally remote selecting menu item of the TV by a remote controller in the remote method of present invention.
Figure 9:
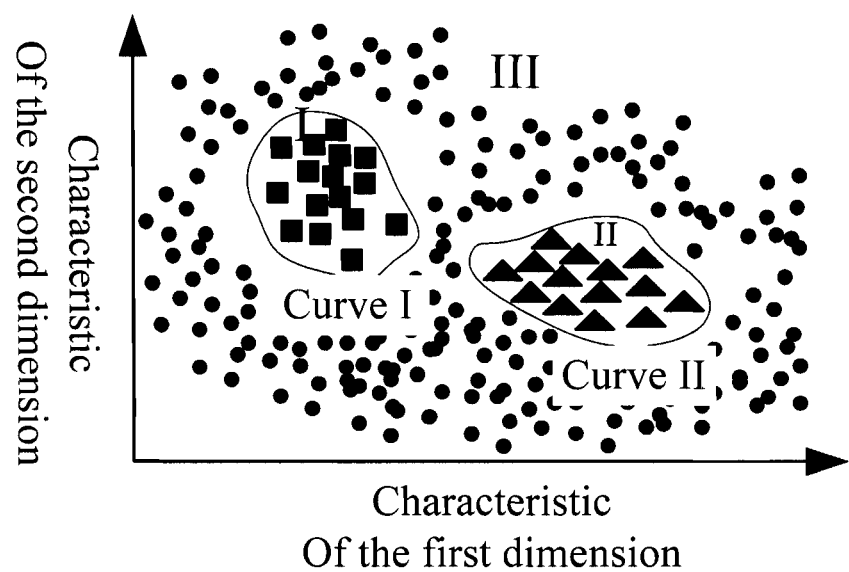
FIG. 9 is a diagram showing compute processing and training classifying of the instruction parsing unit in the remote method of present invention.

Take menu selection example in FIG. 7 as example too, when the user needs to adjust volume, as the volume adjustment is a value, so there is no next menu in the volume menu item, so when the left key is pressed to adjust volume, the screen will display progress bar of the volume adjusting, as shown in FIG. 8.

When the progress bar are horizontally arranged on the screen of the controlled apparatus, move the remote controller rightwards and the volume increases, and move the remote controller leftwards and the volume decreases. The TV processing control system of present invention completes mapping of remote controller position to volume progress bar position, displays volume corresponding to current position on the screen in real time, and adjusts the TV volume to the volume corresponding to the current position.

In the method of present invention, when the volume is adjusted to a user desired volume, the user presses the left key of the remote controller, and the signal transmitter transmits massage that the left key is pressed to the TV processing control system. The TV processing control system confirms the menu event has been finished, and eliminate progress bar shown on the TV screen.

It should be illuminated that, the progress bar also can be vertical control bar. At this time, the progress bar can be set by vertical position or horizontal position arranged, or can be predetermined according to user's use habit.

The processing process of the horizontal mapping relationship in the method of present invention is illuminated in detail as follows.

Construct an absolute coordinate system for present invention, determine 3D coordinate of the remote controller in the coordinate system, and map the 3D coordinate of the remote controller to the coordinate of the TV screen.

For convenience, a body coordinate system of a certain camera in the two cameras can be used as a world coordinate system. Considering the fact that the TV is always placed horizontally, when assembling the camera, the optical axis $OZ_w$ of the camera is perpendicular to the surface of the screen onwards, $OX_w$ axis is horizontal and rightward, $OY_w$ axis is perpendicular and downward.

Supposing the position of the remote controller is $(x_w, y_w, z_w)$ at a certain time, then map $x_w$ to corresponding menu position. Supposing the position of the remote controller is $(x_0, y_0, z_0)$ when the right key is pressed, the distance of graduation resolution of the progress bar corresponding to the $OY_w$ direction is s. In order to make sure convenience of the operation, the set of s should consider moveable distance of the human hand and arm and the precision determination of the location of the characteristic composition.

Supposing the menu of current level has K+1 graduations (0~K) in total, the menu item number corresponding to current position is p, wherein, p is a nonnegative integer not greater than K, then the mapping relationship between the current position of the remote controller and the menu item number p is:

$$p = \begin{cases} 1 & x_w \leq x_0 + d \\ [(x_w - x_0)/s] & x_0 + s < x_w < x_0 + Kd \\ N & x_w \geq x_0 + Kd \end{cases} \quad (5)$$

Wherein, $[(x_w-x_0)/s]$ expresses an integer after rounding and not greater than distance $(x_w-x_0)/s$.

In present invention, when locating the characteristic component of the remote controller, the image position of the characteristic component should be determined at first, and then implement a characteristic matching to the characteristic component. Finally, the physical position of the characteristic component can be determined through a stereovision algorithm which can be realized by prior art. The stereovision algorithm may refer to textbook such as "machine vision" (written by Zhangguangmin), and so on, and not described here for concise.

In additional, the parameter calibrating of the camera can be completed by camera calibration toolbox for matlab (www.vision.caltech.edu/bouguetj/calib_doc/).

In order to facilitate extraction of the characteristic from the characteristic component, centrosymmetric characteristics significantly different from the environmental circumstance can be selected from the characteristic component according to the lens of the camera. For example, for visible light camera, dark solid circle and solid pentagram, solid hexagon and so on can be selected, for camera with infrared ray filter, solid circle and solid pentagram, solid hexagon with IR reflectorized paint can be selected. Herein, the function of the infrared ray filter is filtering light of other frequency except the IR light.

In embodiment of present invention, camera with infrared ray filter can be employed, and the characteristic can select solid circle, as shown in FIG. 6. Because there in few interfere in the imaging of the camera is simple, and the characteristic component can be outstood by simple binary algorithm, then compute the barycenter of the characteristic component, the center position of the characteristic component can be obtained. When center position of the characteristic are obtained from the left, and right cameras, the two barycenter points are matched. When the remote controller is far away from the camera, the characteristic component is a small bright spot. In order to make the characteristic detection progress operates stably, blob detecting arithmetic is used as detecting arithmetic http://opencvlibrary.sourceforge.net/cy-BlobsLib).

When obtained the blob sequence, the characteristic point is identified at first, and the filtering method is:

A. obtain circumscribed rectangle of the circumscribed ellipse, and external ellipse of current blob;

B. if the length of the circumscribed rectangle of the current blob is greater than a predetermined threshold Len_max, or smaller than a predetermined threshold Len_min, delete current blob from the sequence, or else perform step C;

C. if the width of the circumscribed rectangle of the current blob is greater than a predetermined threshold Len_max or smaller than a predetermined threshold Wid_min, delete current blob from the sequence, or else perform step D;

D. if the length-width ratio is smaller than 0.5 or greater than 2, delete current blob from the sequence.

Repeat steps A to D until all the blob operations are finished, then obtain a blob sequence candidate, and perform step E.

E. select a blob having a biggest area ratio of blob area and its circumscribed ellipse.

Perform characteristic detection to the image collected by the upper and lower cameras, and obtain a pair of corresponding characteristics.

To sum up, in the remote control system for electronic device and remote control method thereof, the location of the remote controller is completed by at least a camera arranged on the controlled apparatus, and the physical position of the remote controller is mapped to the screen position of the controlled apparatus, so that suspended operation of the remote controller can be realized, without requirement like that the mouse only can move in a plane. In addition, the controlled apparatus also has good operation interface, which make the operation of the remote controller concision, reduce the key amount of the remote controller, and simplify the circuit of the remote controller.

It should be noted that, the foregoing description is just the preferred embodiment of the invention. It is not intended to limit the invention. Any modifications, variations, and amelioration without departing from the spirit and scope of the present invention should be included in the scope of the prevent invention.

The invention claimed is:

1. A remote control system, comprises a controlled apparatus (120) and a remote controller (100), the controlled apparatus (120) comprises a processing control system (121) and an instruction execution unit (125), wherein, the processing control system (121) further comprises a characteristic composition extraction unit (123), an instruction parsing unit (124), the characteristic composition extraction unit (123) is connected to a plurality of video capturing devices (122), extracts image of the characteristic composition from obtained video image, and processes and determines position of the extracted image, the instruction parsing unit (124) is used for interpreting moving track of the characteristic composition extracted by the characteristic composition extraction unit (123) to corresponding instruction according to predetermined mapping relationship between the moving track of the characteristic composition and instruction and gives the instruction execution unit (125) the instruction to execute;

wherein the processing control system (121) further comprises a coordinate mapping unit (127), which is used to show the position of the remote controller on the display after computing according to moving position of the remote controller characteristic component obtained by the characteristic extraction unit (123) while the instruction parsing unit (124) is transmitting corresponding instruction;

wherein, the process of mapping the position of the remote controller from the image coordinate to the screen coordinate of the display is:

supposing the screen width is Width_scr, the height is Height_scr, then point (u,v) on the screen satisfies following conditions: Width_scr, Height_scr are natural numbers, u is a nonnegative integer smaller than Width_scr, and v is a nonnegative integer smaller than Height_scr;

supposing the width of the imaging plane is Width_cam, the height is Height_cam, supposing the operation area of the remote controller is an area imaging in a certain rectangle, supposing the left top angular point is (x_ul, y_ul), and the right top angular point is (x_lr, y_lr), wherein, x_ul, y_ul, x_lr, y_lr are all integers, and 0≤x_ul<x_lr<Width_scr, 0≤y_ul<y_lr<Height_scr;

supposing the position of the remote controller in the imaging plane of the camera is (x_cam, y_cam), (x_scr, y_scr) the position is after mapping to the screen coordinate system, then the mapping relationship can be expressed as follows:

$$x_{scr} = \begin{cases} 0 & x\_cam < x\_ul \\ (x\_cam - x\_ul)\dfrac{Width\_scr - 1}{x\_lr - x\_ul} & x\_ul \leq x\_cam \leq x\_rl \\ Width\_scr - 1 & x\_cam > x\_rl \end{cases}$$

$$y_{scr} = \begin{cases} 0 & y\_ul \leq y\_cam \leq y\_rl \\ (y\_cam - y\_ul)\dfrac{Height\_scr - 1}{y\_lr - y\_ul} & y\_ul \leq y\_cam \leq y\_rl \\ Width\_scr - 1 & y\_cam > y\_rl. \end{cases}$$

2. The remote control system according to claim 1, wherein, the instruction parsing unit (124) comprises an identifying unit which forms the characteristic composition images extracted by the characteristic extraction unit (123) into a sequence according to the time order, then identifies the moving track to corresponding motion mode.

3. The remote control system according to claim 1, wherein, the remote controller (110) comprises a left key (310), a right key (320) and a signal transmitter (112) connected to the left key (310) and the right key (320), wherein, the controlled apparatus (120) comprises a wireless receiving apparatus (128) for receiving instruction transmitted from the wireless transmitting apparatus (112) on the remote controller (110), and transmitting the instruction to the processing control system (121) for processing.

4. The remote control system according to claim 1, wherein, the processing control system (121) further comprises a 3D reconstructing unit (129) arranged between the characteristic extraction unit (123) and the instruction parsing unit (124), and the 3D reconstructing unit (129) is used for 3D reconstructing the obtained moving track of the remote controller characteristic composition (111), so as to identify control instruction from the 3D track position by the instruction parsing unit (124).

\* \* \* \* \*